US009092538B2

(12) United States Patent
Katz et al.

(10) Patent No.: US 9,092,538 B2
(45) Date of Patent: Jul. 28, 2015

(54) SYSTEM AND METHOD FOR DETERMINING THE DATA MODEL USED TO CREATE A WEB PAGE (75) Inventors: Gregory Talbott Katz, Seattle, WA (US); Mark Massé, Snoqualmie, WA (US)

(73) Assignee: Disney Enterprises, Inc., Burbank, CA (US)

( * ) Notice: Subject to any disclaimer, the term of this patent is extended or adjusted under 35 U.S.C. 154(b) by 1195 days.

(21) Appl. No.: 12/241,447

(22) Filed: Sep. 30, 2008

(65) Prior Publication Data
US 2010/0083097 A1    Apr. 1, 2010

(51) Int. Cl.
G06F 17/00 (2006.01)
G06F 17/30 (2006.01)
G06F 3/048 (2013.01)
G06F 17/21 (2006.01)
G06F 21/12 (2013.01)
G06F 17/24 (2006.01)
G06F 3/0481 (2013.01)
G06F 9/54 (2006.01)
G06F 9/455 (2006.01)

(52) U.S. Cl.
CPC .... G06F 17/30896 (2013.01); G06F 17/30893 (2013.01); G06F 3/048 (2013.01); G06F 3/0481 (2013.01); G06F 9/45529 (2013.01); G06F 9/547 (2013.01); G06F 17/212 (2013.01); G06F 17/24 (2013.01); G06F 17/30017 (2013.01); G06F 17/30174 (2013.01); G06F 21/128 (2013.01)

(58) Field of Classification Search
CPC . G06F 17/30893; G06F 17/24; G06F 17/212; G06F 17/30017; G06F 17/30165; G06F 17/30174; G06F 9/547; G06F 9/45529; G06F 21/128; G06F 3/048; G06F 3/0481
USPC ......... 715/231–237, 243–256, 731, 762–764, 715/777, 783, 739, 238
See application file for complete search history.

(56) References Cited

U.S. PATENT DOCUMENTS

| 7,173,933 | B1 * | 2/2007 | O'Rourke et al. | 370/389 |
| 7,836,303 | B2 * | 11/2010 | Levy et al. | 713/168 |
| 2004/0168128 | A1 * | 8/2004 | Friedman et al. | 715/530 |
| 2005/0229101 | A1 * | 10/2005 | Matveyenko et al. | 715/530 |
| 2005/0257128 | A1 * | 11/2005 | Pasquali et al. | 715/500 |
| 2006/0248442 | A1 * | 11/2006 | Rosenstein et al. | 715/501.1 |
| 2007/0027950 | A1 * | 2/2007 | Mori et al. | 709/203 |
| 2009/0006454 | A1 * | 1/2009 | Zarzar et al. | 707/102 |
| 2009/0235158 | A1 * | 9/2009 | Rosenstein et al. | 715/234 |
| 2010/0011061 | A1 * | 1/2010 | Hudson et al. | 709/204 |
| 2010/0049720 | A1 * | 2/2010 | Sharp et al. | 707/10 |
| 2010/0115023 | A1 * | 5/2010 | Peled | 709/203 |
| 2010/0306644 | A1 * | 12/2010 | Underwood et al. | 715/234 |

* cited by examiner

Primary Examiner — Quoc A Tran
(74) Attorney, Agent, or Firm — Patterson + Sheridan, LLP (57) ABSTRACT A system for determining the data used to create a web page includes a web server configured to generate a web page, the web page comprising at least one content object, a content management system coupled to the web server and a content manifest provided by the web server, the content manifest including a content identifier for the at least one content object on the web page.

13 Claims, 5 Drawing Sheets

SYSTEM AND METHOD FOR DETERMINING THE DATA MODEL USED TO CREATE A WEB PAGE

BACKGROUND

Typically, when a web browser makes a request for a web page, the requested web page is generated by a web server. To generate the web page, the web server may apply complex domain logic to determine which data to retrieve from one or more data sources. A typical example of a data source is a content management system, which stores and serves content objects. In an example, a content management system allows a user, also referred to as an "editor," to create and update those content objects. Once the web server retrieves data (such as content objects) from its data sources, the web server combines the data with presentation logic to generate the requested web page and serve it to the web browser. The generated web page is said to contain the retrieved data. For example, if a web server retrieves three content objects, arbitrarily referred to as C1, C2, and C3, in order to generate a web page, arbitrarily referred to as P, the web page, P, is said to contain content objects C1, C2, and C3. Together, the domain logic and presentation logic make up the web server's page generation logic.

A user functioning as an editor is often called upon to update a web page by updating the content objects that the web page contains using a content editing tool that is provided as part of a content management system. However, determining the relationship between a web page and the content objects contained in the web page is difficult, and finding the relevant content objects using a content editing tool can be laborious and error-prone. An editor may be provided with documented procedures to follow to accomplish these tasks, but due to the frequency with which web sites and web pages are changed, such documented procedures soon become obsolete.

Therefore, it would be desirable to have a way to identify all of the content objects contained within a particular web page and to allow an editor to find these content objects using a content editing tool.

SUMMARY

Embodiments of the invention include a system for determining the data model used to create a web page comprising a web server configured to generate a web page, the web page comprising at least one content object, a content management system coupled to the web server and a content manifest provided by the web server, the content manifest including a content identifier for the at least one content object on the web page.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

The system and method for determining the data model used to create a web page will be described in the context of delivering information over the world wide web (WWW) to a browser. However, the system and method for determining the data model used to create a web page is applicable to determining the data model used to create any web page. Further, the system and method for determining the data model used to create a web page can be used to determine the data used to create a web page in any delivery format, such as, for example, delivering wireless access protocol (WAP) data to a mobile device, or delivering other types of data to a mobile device or to any device, such as a personal computer, home appliance, or any other device. As used herein, in an embodiment, the term "data model" refers to the content objects that are used to create a web page.

The system and method for determining the data model used to create a web page can be implemented in hardware, software, or a combination of hardware and software. When implemented in hardware, the system and method for determining the data model used to create a web page can be implemented using specialized hardware elements and logic. When the system and method for determining the data model used to create a web page is implemented in software, the software can be used to control the various components in a system and network associated with the program. The software can be stored in a memory and executed by a suitable instruction execution system (microprocessor). The hardware implementation of the system and method for determining the data model used to create a web page can include any or a combination of the following technologies, which are all well known in the art: discrete electronic components, a discrete logic circuit(s) having logic gates for implementing logic functions upon data signals, an application-specific integrated circuit having appropriate logic gates, a programmable gate array(s) (PGA), a field programmable gate array (FPGA), etc.

The software for the system and method for determining the data model used to create a web page comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any non-transitory means that can contain, store, or transport the program for use by or in connection with the instruction execution system, apparatus, or device. The computer-readable medium can be, for example but not limited to, an electronic, magnetic, optical, electromagnetic, infrared, or semiconductor system, apparatus, device, or other non-transitory medium. More specific examples (a non-exhaustive list) of the computer-readable medium would include the following: a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

Figure 1:
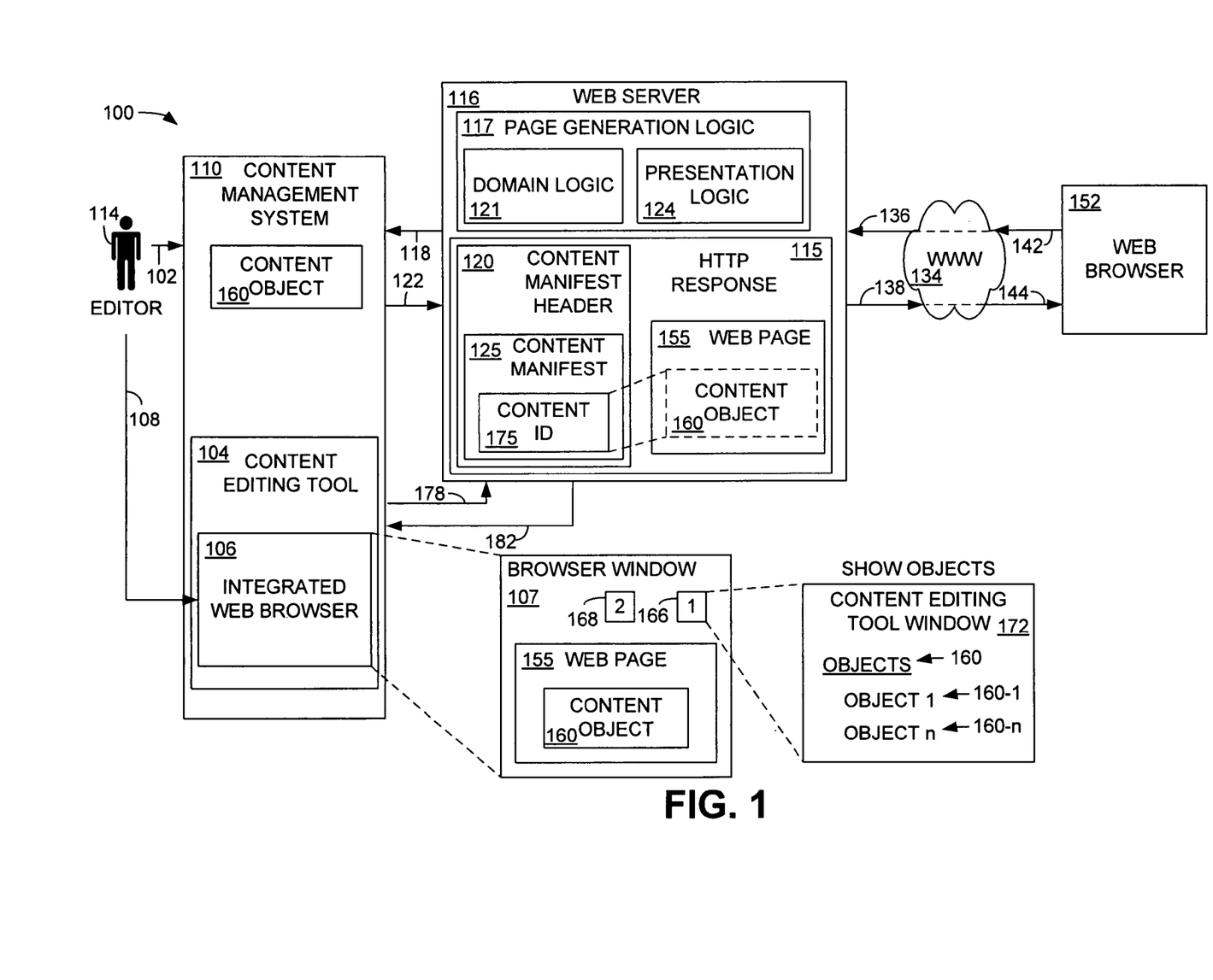
FIG. 1 is a block diagram illustrating an example of a system for determining the data model used to create a web page.

FIG. 1 is a block diagram illustrating an example of a system 100 for determining the data model used to create a web page. The system for determining the data model used to create a web page includes a content management system 110. The content management system 110 can be any system that is used to manage content objects that can be delivered to a web browser 152 over the world wide web (WWW) 134. An example of a content object is content object 160. However, it is understood that many different content objects 160 are typically part of a generated web page. A content object can be any data that is used to generate a web page, such as, for example, text, graphics, images, audio, video, etc. The content management system 110 generally includes a content editing tool 104, which includes an integrated web browser 106 and at least one content object 160. The content object 160 can be any logical unit of content. Although shown in FIG. 1 as a single content object 160, there are typically many content objects 160. The content management system 110 also includes many other elements (not shown) that are used to manage content that is delivered over the world wide web 134. However, these elements are omitted for simplicity of illustration. An editor 114 can access the content editing tool 104 and its integrated web browser 106 directly over connection 102 and connection 108 to manipulate and update the content object 160.

The content management system 110 is in communication with a web server 116 over connections 118 and 122. The connections 118 and 122 are shown as separate directional communication lines, but can also be implemented as a single bi-directional communication line as known in the art. The web server 116 includes page generation logic 117. The page generation logic 117 can be, for example, a presentation template. The page generation logic 117 includes domain logic 121 and presentation logic 124. The web server 116 generates web pages, such as web page 155 using the page generation logic 117 and the at least one content object 160 that is retrieved from the content management system 110, as will be described below. In an embodiment, the web server 116 retrieves the content object 160 from the content management system 110 during execution of the page generation logic 117 that generates a web page 155. Accordingly, the content object 160 is illustrated using a dotted line in the web server 116 to denote that the content object 160 originates in the content management system 110 and is retrieved by the web server 116.

In accordance with an embodiment of the system for determining the data model used to create a web page, when generating a web page, the web server 116 generates a hypertext transfer protocol (HTTP) response 115. The HTTP response 115 includes at least one HTTP response header and an HTTP response body. The HTTP response header and the HTTP response body will be described in greater detail below. In an embodiment, and among other elements, the HTTP response 115 includes a content manifest header 120, a content manifest 125, and one or more content identifiers 175. As will be described below, the content manifest 125 includes a list of content identifiers 175 identifying all of the content objects 160 used on a web page 155. In an embodiment, each content identifier 175 identifies a single content object 160 used on a web page 155.

The web server 116 communicates with a web browser 152 over the world wide web 134. The web server 116 is coupled to the world wide web 134 over connections 136 and 138. While the connections 136 and 138 are illustrated as separate directional communication lines, it should be understood that web server 116 can by coupled to the world wide web 134 over a single bi-directional communication link.

The web browser 152 is coupled to the world wide web 134 over connections 142 and 144. The connections 142 and 144 can be any bi-directional communication link that allows a web browser to access the world wide web.

In accordance with an embodiment of the system and method for determining the data model used to create a web page, when an editor 114 accesses the integrated web browser 106, the integrated web browser 106 initiates a request for a web page to the web server 116 over connection 178. The web server 116 responds to the request with the requested web page 155 and additional metadata, referred to herein as the content manifest 125, over connection 182. The content manifest 125 includes the content identifiers 175 that identify all of the content objects 160 that are used to generate the particular web page 155.

In an embodiment, the content manifest 125 is provided as an additional HTTP header referred to as a content manifest header 120. The system and method for determining the data model used to create a web page is applicable to web pages created using Hyptertext Markup Language (HTML), WAP (Wireless Access Protocol) Markup Language (WML), Extensible Markup Language (XML), plain text, or any other format that the web server 116 provides. The content manifest 125 is illustrated as residing in the web server 116. The content manifest header 120 can be implemented as, for example, metadata including content identifiers 175 that are used to identify all of the content objects 160 that are used to create the particular web page that the editor 114 is attempting to edit.

An example of the content manifest header 120 is
HTTP/1.1 200 OK
Connection: Keep Alive
Content-Length: 5345
Content-Type text/html; charset=iso-8859-1
Content-Manifest: CMS-100: CMS-105: CMS-123

In this example, the content manifest header 120 includes content identifiers that identify the content objects "100," "105," and "123" that are associated with the web page 155.

In accordance with an embodiment of the system and method for determining the data model used to create a web page, when an editor 114 views a web page 155 through the integrated web browser 106, the integrated web browser 106 retrieves the HTTP response 115 containing the web page 155 and the content manifest header 120 via connection 182 from the web server 116. The integrated web browser 106 parses the content manifest header 120, generates a browser window 107 within which the web page 155 is displayed, and enables a "show objects" button 166 and a "search within objects" button 168. The show objects button 166 displays to the editor 114 an interface, illustrated as a content editing tool window 172 that includes all of the content objects 160 in the content management system 110 that are used to create that web page 155. The search within objects button 168 allows the editor 114 to search for a particular search term within the content objects 160 identified by the content manifest header 120.

Figure 2:
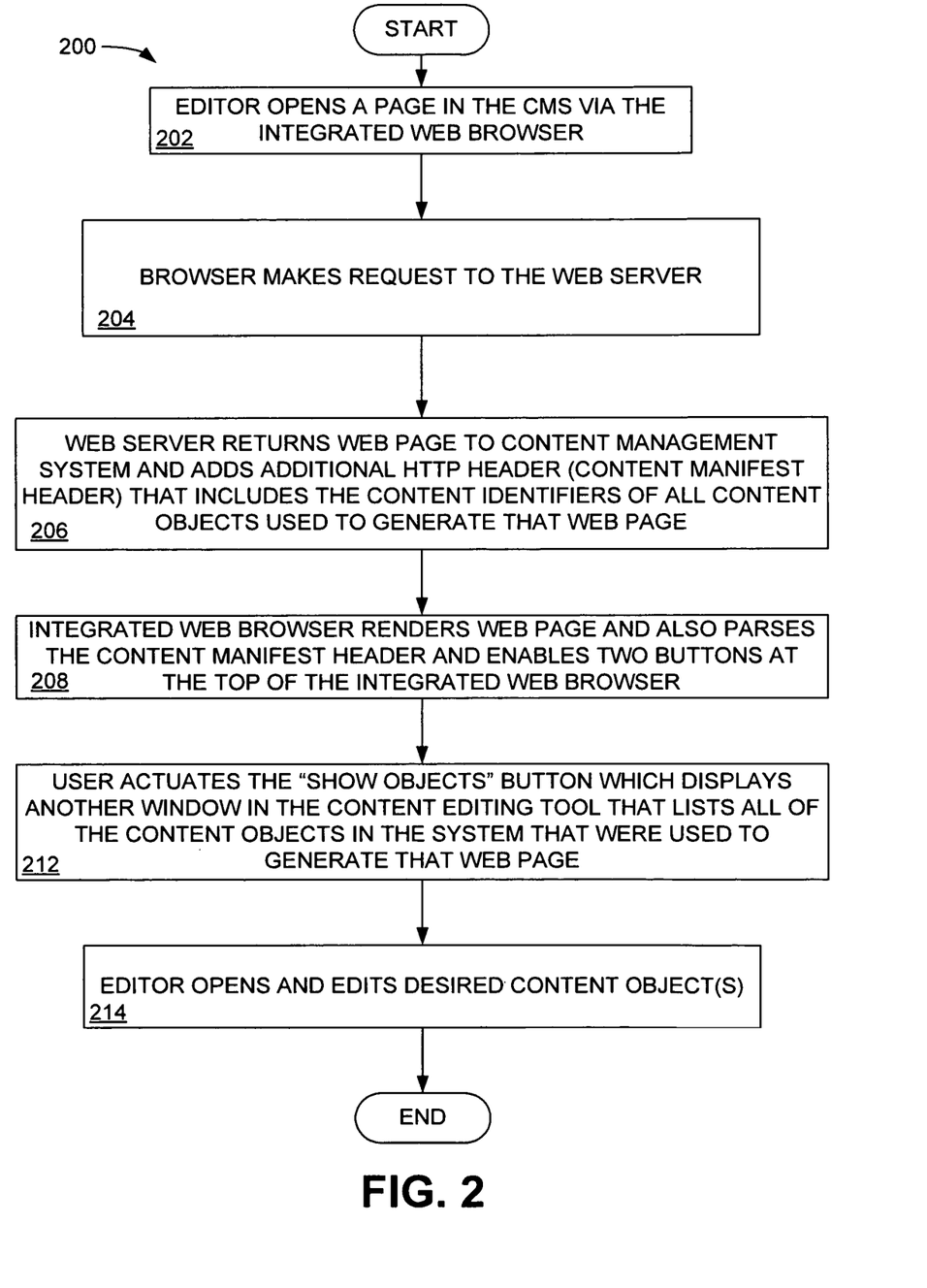
FIG. 2 is a flowchart illustrating an example of a method for determining the data model used to create a web page.

FIG. 2 is a flowchart illustrating the operation of an embodiment of a method 200 for determining the data model used to create a web page.

In block 202, the editor 114 opens the URL (uniform resource locator) of a web page 155 in the content management system 110 using the integrated web browser 106. This action occurs over connection 108.

In block 204, the integrated web browser 106 makes a request over connection 178 from the web server 116 for a particular web page, such as the web page 155.

In block 206, the web server 116 returns the requested page to the integrated web browser 106 over connection 182 and adds a content manifest 125. In an embodiment, the content manifest 125 is part of a content manifest header 120. The content manifest 125 within the content manifest header 120 includes content identifiers 175 for all content objects 160 on the web page 155. The operation of block 206 will be described in greater detail in FIG. 3.

In block 208, the integrated web browser 106 renders the web page 155 and also parses the content manifest header 120 and enables the two buttons 166 and 168 in the browser window 107 in which the web page 155 is displayed.

In block 212, the editor 114 actuates the "show objects" button 166, which then displays the content editing tool window 172. The content editing tool window 172 lists all of the content objects 160 in the system that are used to generate that particular web page. In block 214, the editor 114 opens the desired content objects and, if desired, edits the content objects.

Figure 3:
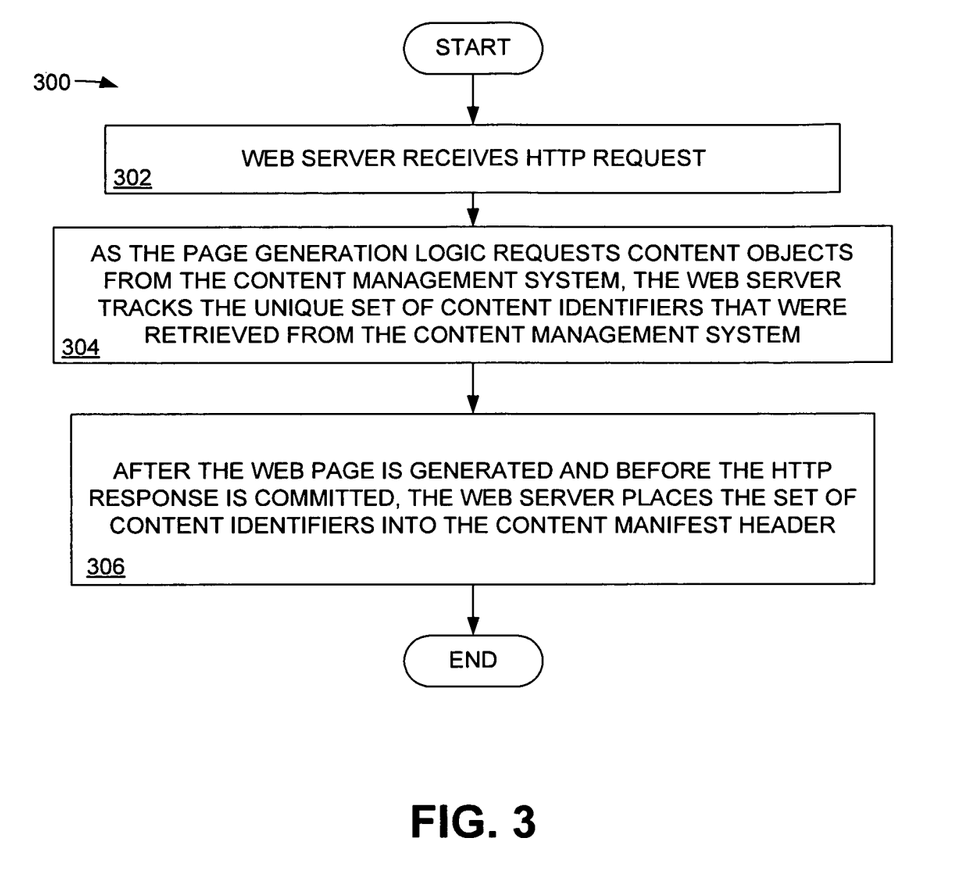
FIG. 3 is a flowchart illustrating an example of the addition by the web server of an HTTP header, referred to as the content manifest header, which identifies all of the content objects contained within a generated web page.

FIG. 3 is a flowchart 300 illustrating an example of the addition by the web server 116 of an HTTP header, referred to as the content manifest header 120 that identifies all of the content objects 160 contained within a generated web page 155.

In block 302 the web server 116 receives an HTTP request from the integrated web browser 106 for a web page 155 over connection 178.

In block 304, as the page generation logic 117 in the web server 116 requests content objects 160 from the content management system 110 over connection 118 so that it can generate the requested page, the web server 116 tracks the set of content identifiers 175 that identify the content objects 160 that are retrieved from the content management system 110.

In block 306, after the web page 155 is generated by the web server 116, and before the HTTP response 115 to the integrated web browser 106 is committed, the web server 116 places the set of content identifiers 175 into the content manifest header 120. The content manifest header 120 is included as part of the HTTP response 115 provided over connection 182 to the integrated web browser 106. The HTTP response 115 will be explained in greater detail below.

The content manifest 125 in the content manifest header 120 informs the content management system 110 of the set of content objects 160 that are used to generate a web page 155. Identifying all of the content objects 160 associated with a particular web page 155 allows an editor 114 using the content editing tool 104 to open and edit any of the content objects 160 on the web page 155.

Figure 4:
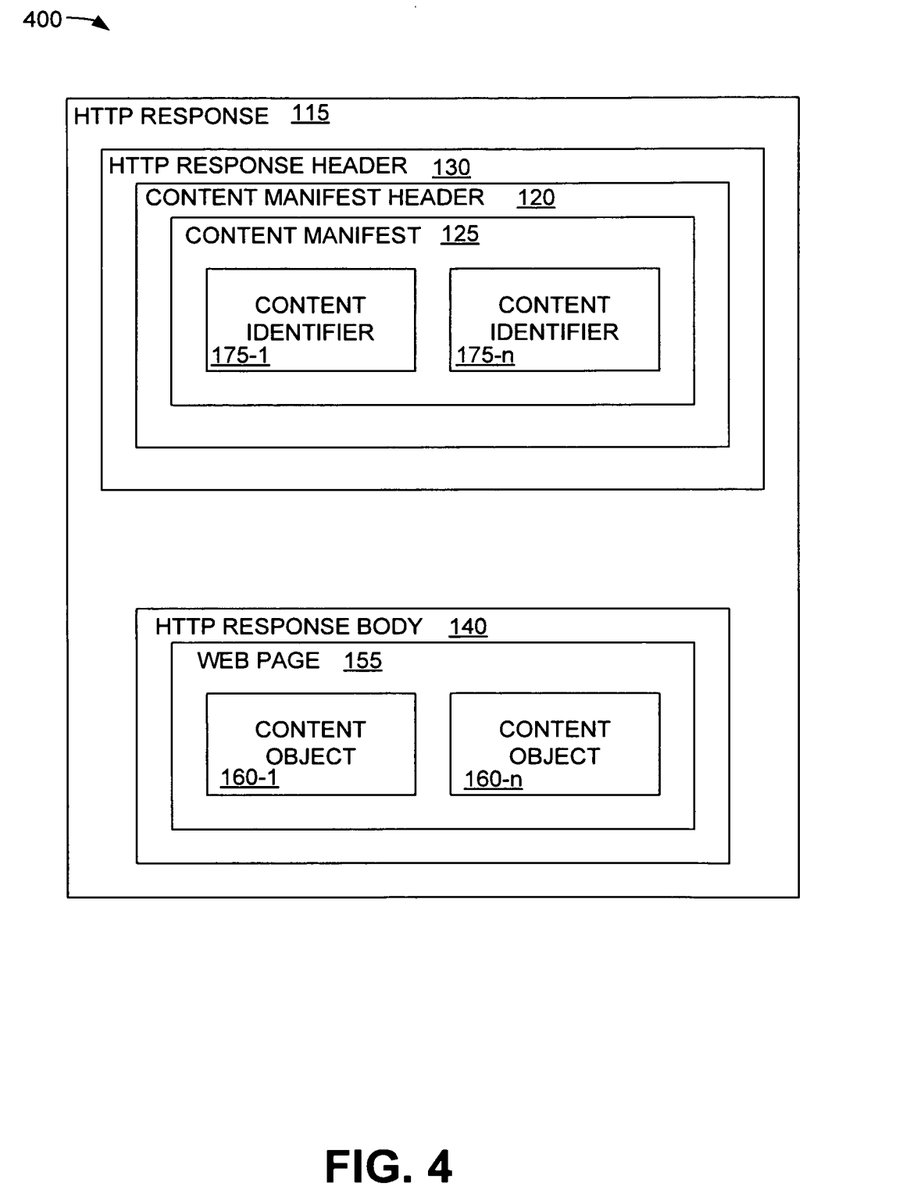
FIG. 4 is a schematic diagram illustrating an example of a data structure of the HTTP response of FIG. 1.

FIG. 4 is a schematic diagram illustrating an example of a data structure 400 of the HTTP response 115 of FIG. 1.

The data structure of the HTTP response 115 includes at least one HTTP response header 130 and an HTTP response body 140. There are typically a number of HTTP response headers 130. In an embodiment, the content manifest header 120 is considered a response header 130, so the set of response headers 130 includes the content manifest header 120. The HTTP response headers 130 include the content manifest header 120, the content manifest 125 and at least one content identifier 175. In this example, there are "n" content identifiers 175-1 through 175-n.

The HTTP response body 140 includes the web page 155 containing the content objects 160-1 through 160-n that are used on the web page 155. Each web page 155 is encapsulated in an HTTP response 115 as it is returned by the web server 116 to the web browser 152 or to the integrated web browser 106. The HTTP response 115 allows metadata to be provided along with the web page 155, but not within the web page 155. The metadata includes at least one HTTP response header 130. One of the HTTP response headers 130 is the content manifest header 120, which contains the content manifest 125, which includes content identifiers 175-1 through 175-n.

In addition to web pages made up of hypertext markup language (HTML) the system and method for determining the data model used to create a web page also is applicable to web pages made up of WML, XML, plain text, or any other format provided by the web server 116. Because there is little commonality among these web page formats, and no uniform mechanism for metadata inclusion, placing the content manifest 125 in an HTTP response header 130 makes the system and method for determining the data model used to create a web page applicable to all formats by placing the metadata "alongside of" the web page 155 instead of "within" it.

When the editor 114 uses the integrated web browser 106 to display a web page 155, the integrated web browser 106 receives the HTTP response 115 from the web server 116. The HTTP response 115 contains the content manifest 120, as described above. The integrated web browser 106 reads the content manifest header 120 from the HTTP response headers 130, parses the content manifest 125 contained within the content manifest header 120, and stores the content manifest 125 for later use when actuating the buttons 166 and 168. When the editor 114 clicks the show objects button 166 (FIG. 1), the integrated web browser 106 requests that the content editing tool 104 display the list of content objects 160 identified by the content identifiers 175 contained within the stored content manifest 125.

Figure 5:
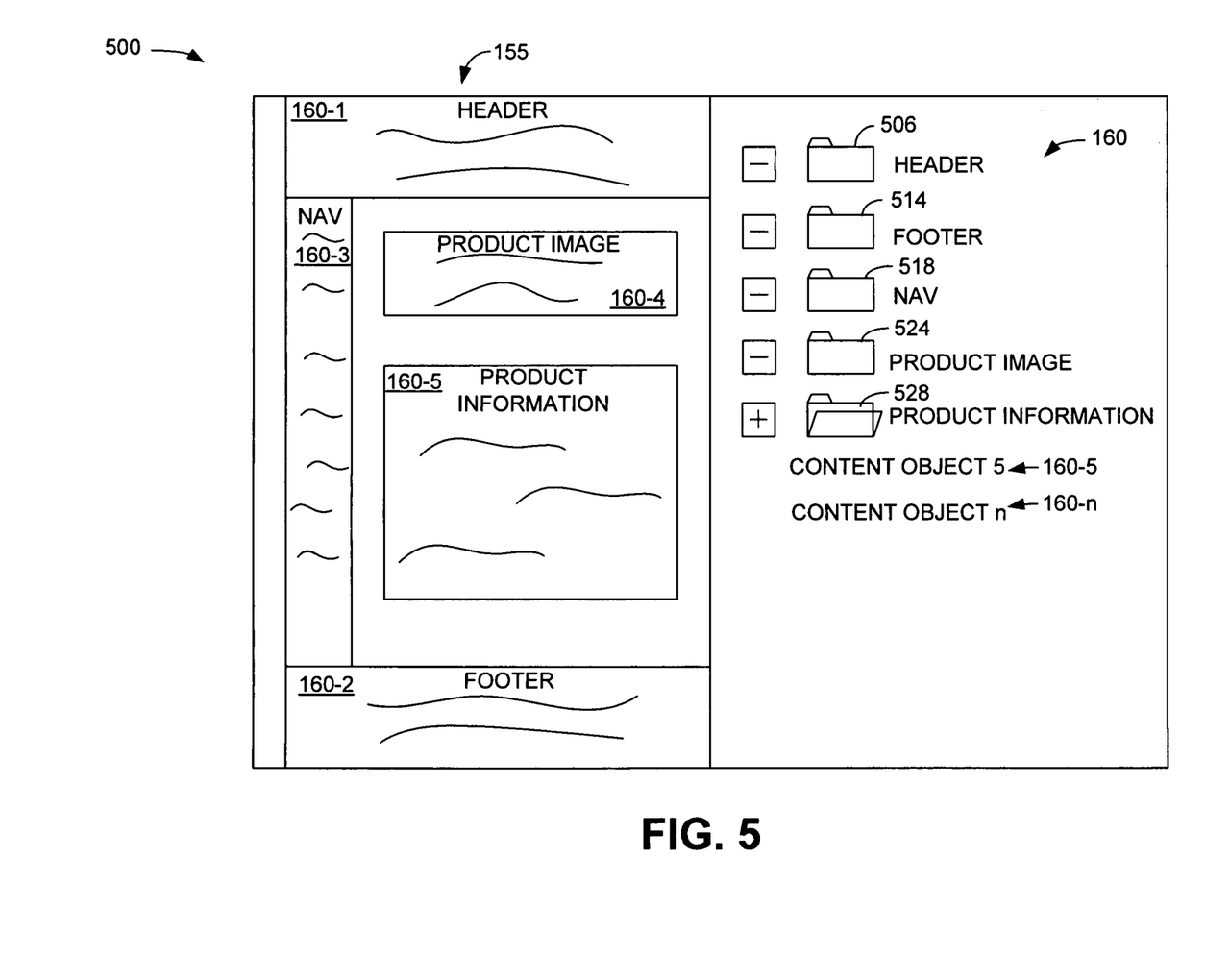
FIG. 5 is a graphical illustration of a graphical interface provided by the integrated web browser.

FIG. 5 is a graphical illustration of a graphical interface provided by the integrated web browser. The graphical interface 500 allows the editor 114 to simultaneously view the web page 155 and the content objects 160 used to create the web page 155. For example, all of the content objects used to create the header 160-1 are located in the header objects folder 506. Similarly, all of the content objects used to create the footer 160-2 are located in the footer objects folder 514; all of the content objects used to create the navigation pane 160-3 are located in the navigation objects folder 518; all of the content objects used to create the product image 160-4 are located in the product image objects folder 524; and all of the content objects used to create the product information 160-5 are located in the product information objects folder 528. In this example, the product information objects folder 528 includes content objects 160-5 through 160-n. In this manner, all of the content objects used to create a web page 155 are logically organized and accessible to an editor 114.

While various embodiments of the invention have been described, it will be apparent to those of ordinary skill in the art that many more embodiments and implementations are possible that are within the scope of the invention.

What is claimed is:

1. A system for determining the data used to create a web page, comprising a web server coupled to a content management system, the web server configured to, in response to receiving a request specifying a web page from a requesting entity:

retrieve a plurality of copies of a plurality of content objects from the content management system, wherein the content management system is configured to store and manage the plurality of content objects;

generate the web page using the retrieved plurality of copies of the plurality of content objects;

prior to returning the generated web page to the requesting entity, generate a content manifest header containing a list of content identifiers, wherein each content identifier in the list of content identifiers uniquely identifies, within the content management system, a respective one of the plurality of content objects, and wherein each content identifier can be used to query the content management system to access the corresponding content object;

insert the generated content manifest header into an HTTP header of the web page, such that the requesting entity can query the content management system using the list of content identifiers within the generated content manifest header to access and edit the plurality of content objects within the content management system; and return the web page containing the generated content manifest header to the requesting entity, wherein the requesting entity is configured to provide an interface that depicts
(i) a rendered form of the web page and
(ii) the plurality of copies of the plurality of content objects, wherein the interface is generated based on the list of content identifiers within the content manifest header of the web page, and
wherein the interface enables users to access and edit the plurality of content objects within the content management system by submitting a query to the content management system specifying content identifiers from the list of content identifiers to access the corresponding content objects within the content management system.

2. The system of claim 1, further comprising a web browser integrated into the content management system, the integrated web browser configured to parse the content manifest header to identify the plurality of content objects on the web page.

3. The system of claim 2, in which the integrated web browser further includes an interface that includes the plurality of content objects on the web page.

4. The system of claim 3, further comprising a content editing tool associated with the integrated web browser, wherein the integrated web browser enables the content editing tool to select one of the plurality of content objects.

5. The system of claim 4, in which the content editing tool can search for a term in the plurality of content objects.

6. A method for determining the data used to create a web page, comprising:

in response to receiving a request specifying a web page from a requesting entity:

retrieving a plurality of copies of a plurality of content objects from the content management system, wherein the content management system is configured to store and manage the plurality of content objects;

generating the web page using the retrieved plurality of copies of the plurality of content objects;

prior to returning the generated web page to the requesting entity, generating a content manifest header containing a list of content identifiers, wherein each content identifier in the list of content identifiers uniquely identifies, within the content management system, a respective one of the plurality of content objects, and wherein each content identifier can be used to query the content management system to access the corresponding content object;

inserting the generated content manifest header into an HTTP header of the web page, such that the requesting entity can query the content management system using the list of content identifiers within the generated content manifest header to access and edit the plurality of content objects within the content management system; and returning the web page containing the generated content manifest header to the requesting entity, wherein the requesting entity is configured to provide an interface that depicts
(i) a rendered form of the web page and
(ii) the plurality of copies of the plurality of content objects, wherein the interface is generated based on the list of content identifiers within the content manifest header of the web page, and
wherein the interface enables users to access and edit the plurality of content objects within the content management system by submitting a query to the content management system specifying content identifiers from the list of content identifiers to access the corresponding content objects within the content management system.

7. The method of claim 6, further comprising parsing the content manifest header to identify the plurality of content objects on the web page.

8. The method of claim 7, further comprising providing an interface that includes the plurality of content objects on the web page.

9. The method of claim 6, further comprising providing an interface to enable the selection and editing of one of the plurality of content objects.

10. The method of claim 9, further comprising searching for a term in the plurality of content objects.

11. A method for determining data used to create a web page, comprising:

transmitting, to a web server, a request specifying a web page, wherein the web server is configured to:

retrieve a plurality of copies of a plurality of content objects from the content management system, wherein the content management system is configured to store and manage the plurality of content objects;

generate the web page using the retrieved plurality of copies of the plurality of content objects;

prior to returning the generated web page to the requesting entity, generate a content manifest header containing a list of content identifiers, wherein each content identifier in the list of content identifiers uniquely identifies, within the content management system, a respective one of the plurality of content objects, and wherein each content identifier can be used to query the content management system to access the corresponding content object; and insert the generated content manifest header into an HTTP header of the web page, such that the requesting entity can query the content management system using the list of content identifiers within the generated content manifest header to access and edit the plurality of content objects within the content management system;

receiving the generated web page from the web server; and providing an interface that depicts
 (i) a rendered form of the generated web page and
 (ii) the plurality of copies of the plurality of content objects, wherein the interface is generated based on the list of content identifiers within the content manifest header of the web page, and wherein the interface enables users to access and edit the plurality of content objects within the content management system by submitting a query to the content management system specifying content identifiers from the list of content identifiers to access the corresponding content objects within the content management system.

12. The method of claim 11, further comprising searching for a term in the plurality of content objects.

13. A computer program product for providing a data structure for a web page, the computer program product comprising a non-transitory computer-readable medium on which is stored computer-readable program code for:

in response to receiving a request specifying a web page from a requesting entity:

retrieving a plurality of copies of a plurality of content objects from the content management system, wherein the content management system is configured to store and manage the plurality of content objects;

generating the web page using the retrieved plurality of copies of the plurality of content objects;

prior to returning the generated web page to the requesting entity, generating a content manifest containing a list of content identifiers, wherein each content identifier in the list of content identifiers uniquely identifies, within the content management system, a respective one of the plurality of content objects, and wherein each content identifier can be used to query the content management system to access the corresponding content object;

inserting the generated content manifest header into an HTTP header of the web page, such that the requesting entity can query the content management system using the list of content identifiers within the generated content manifest header to access and edit the plurality of content objects within the content management system; and returning the web page containing the generated content manifest header to the requesting entity, wherein the requesting entity is configured to provide an interface that depicts
 (i) a rendered form of the web page and
 (ii) the plurality of copies of the plurality of content objects, wherein the interface is generated based on the list of content identifiers within the content manifest header of the web page, and wherein the interface enables users to access and edit the plurality of content objects within the content management system by submitting a query to the content management system specifying content identifiers from the list of content identifiers to access the corresponding content objects within the content management system.

* * * * *